April 7, 1925.
O. E. SZEKELY
1,532,608
TORQUE CUSHIONING MEANS
Filed Dec. 14, 1922
2 Sheets-Sheet 2
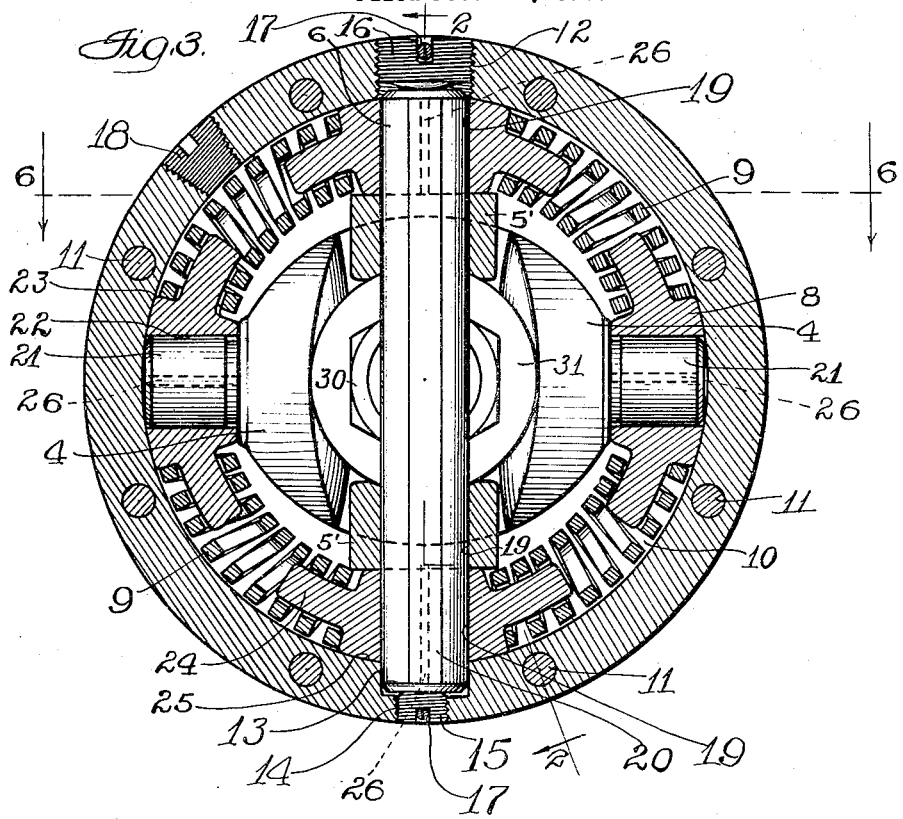
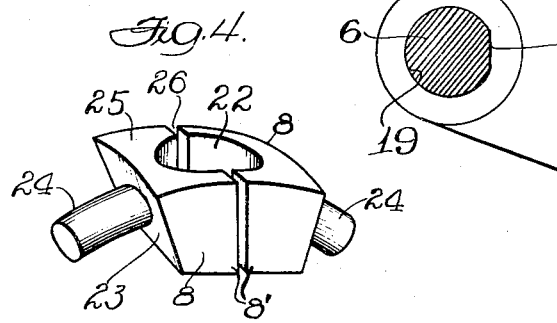
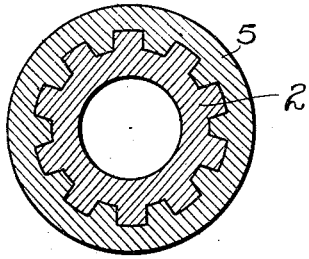
Witnesses:
W. K. Olson
Fred M. Davis
Inventor:
Otto E. Szekely
By Rummler & Rummler
Attys.

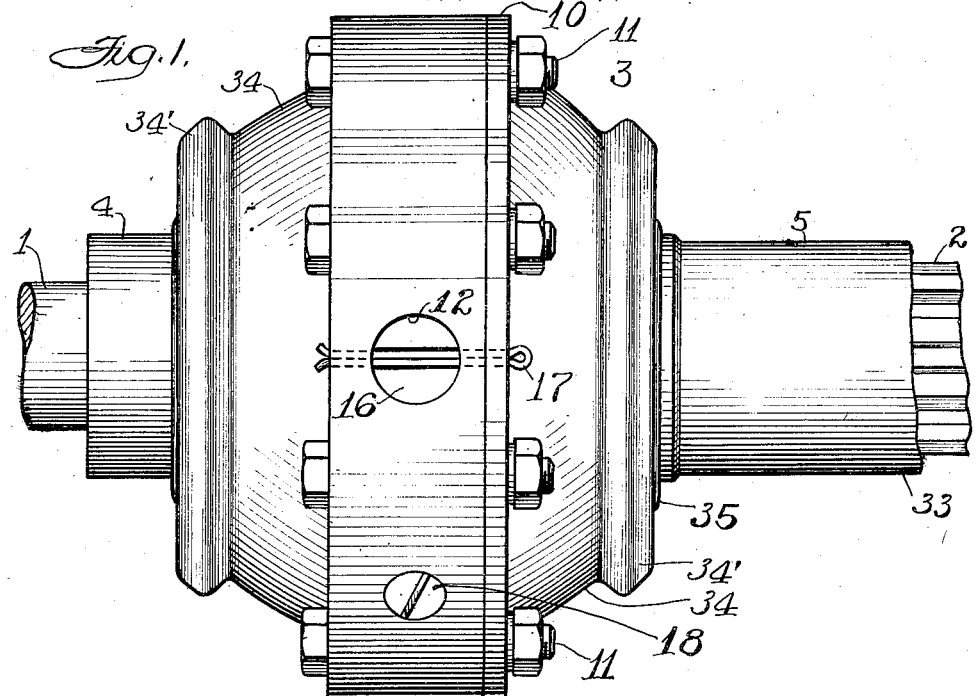
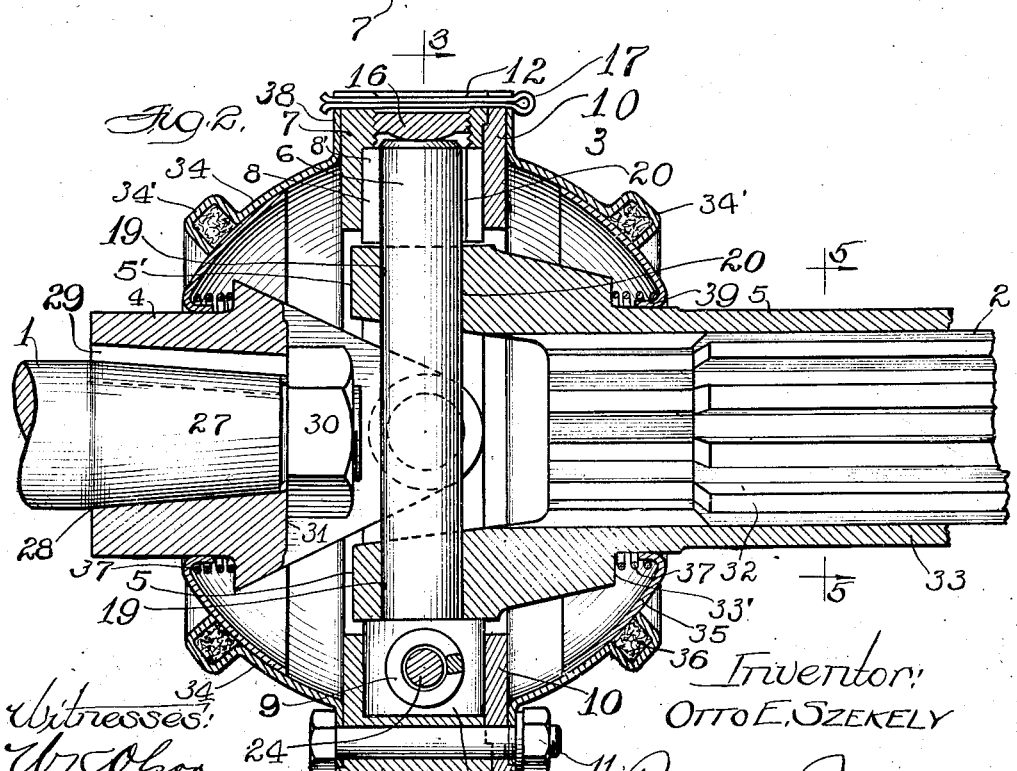

Patented Apr. 7, 1925.

1,532,608

UNITED STATES PATENT OFFICE.

OTTO E. SZEKELY, OF MOLINE, ILLINOIS, ASSIGNOR, BY MESNE ASSIGNMENTS, TO WILLIAM MUTSCHLER, TRUSTEE, OF GOSHEN, INDIANA.

TORQUE-CUSHIONING MEANS.

Application filed December 14, 1922. Serial No. 606,991.

*To all whom it may concern:*

Be it known that I, OTTO E. SZEKELY, a citizen of the United States of America, and a resident of Moline, county of Rock Island, and State of Illinois, have invented a new and useful Improvement in Torque-Cushioning Means, of which the following is a specification.

This invention relates to torque cushioning means for rotary power devices, for instance as applied to motor vehicles. The structure claimed is an improvement over that of the copending Murphy application, Serial No. 584,461, filed August 26, 1922, and provides especially for greater facility in assemblage, installation and maintenance.

The main objects of the invention are to provide an improved form of device of the character stated, better adapted for ready putting together and knock-down, or for interchange of repair parts; to provide in such a device a yoke-ring, trunnion, shoe and spring structure adapted for assembling without need of compression appreciably in excess of the normal no-load compression; to provide a universal joint thus characterized, adapted for installation, removal and repair by persons not skilled in such work or in the use of tools; to provide such a joint of resilient character adapted to immediately absorb all shocks arising from torque action; to provide adjustable means to compensate for wear whereby looseness may be avoided and backlash minimized; and to provide such a device of few and simple parts, adapted for inexpensive manufacture in a durable form and at a low cost.

An illustrative embodiment of this invention is shown in the accompanying drawings, in which—

Figure 1 is a side view of a case-enclosed joint embodying this invention, as connected to a propeller shaft or transmission.

Fig. 2 is a longitudinal section on the line 2—2 of Fig. 3.

Fig. 3 is a cross section on the line 3—3 of Fig. 2.

Fig. 4 is a perspective view of a pair of complementary shoe members assembled in their normal spaced relation.

Fig. 5 is a shaft section on the line 5—5 of Fig. 3.

Fig. 6 is a sectional view on the line 6—6 of Fig. 3, showing the removable yoke pin and coacting yoke arm.

In the construction shown in the drawings, the flexibly connected transmission shaft sections 1 and 2 are operatively unified by a resilient universal joint 3, adapted to cushion the torque effect for all variations in the driving force. The joint mechanism is enclosed in a fluid tight casing as will be explained. The said joint 3 comprises mainly an integral trunnion yoke 4, a yoke 5 having a removable trunnion rod 6, an annular guide 7 to receive the yoke trunnions, trunnion shoes 8 in said guide and cushion springs 9 seated in circular alinement against said shoes, said yokes being adapted for torque effective connection to said shaft sections 1 and 2.

The said guide member 7 is in the form of an inwardly facing channel ring having a removable flange 10, as clearly shown on Figures 1 and 2, said flange being secured by bolts 11. The cylindrical medial part of this channel guide 7 is provided with a radial perforation 12 to admit the trunnion pin 6. Diametrically opposed to perforation 12 is an inwardly facing socket 13 to receive the entering end of pin 6. In the bottom of said socket 13, and concentric therewith, is a perforation 14 adapted to admit a punch or other suitable tool for driving out the pin 6 through said perforation 12. A screw closure plug 15 is provided to normally seal the perforation 14, and a larger plug 16, of similar character, is provided to seal the perforation 12. The pin 6 is thus secured in place with adjustable end stops, and the channel is sealed against leakage of lubricant at these points.

It will be noted that said plug 16 does not extend entirely through the perforation 12, but is set lightly against the adjacent end of pin 6 which extends somewhat into said perforation, and plug 15 extends inward far enough to take the thrust of the other end. Although this provision for extending the pin radially into the apertures 12 and 13 is considered preferably, it is to be understood that the main advantages of the invention as a whole might be accomplished if the pin 6 were somewhat shorter and did not extend into any apertures in the cylindrical part of member 7 when assembled. For the purpose of securing the plugs 15 and 16 positively against accidental displacement, the outer ends thereof are slotted to receive the cotter pins 17, as will be readily understood by reference to the drawings.

In order to provide for convenient lubrication of the joint from time to time, the guide ring 7 is provided with a removable screw plug 18 of conical shape fitting in a correspondingly formed radial perforation, as shown in Figures 1 and 3.

Referring to the yoke member 5, it is to be noted that its arms 5' are perforated at 19 to receive the trunnion pin 6. In order to prevent relative turning of said pin in these yoke perforations, said pin is made flat on one side, as at 20, to fit against the corresponding flat side of each perforation 19. This arrangement prevents any wear on the yoke member, for it limits all movement and corresponding wear to the trunnion-like ends of pin 6 which can be replaced readily from time to time, as may be necessary.

The trunnions 21 of yoke 4 fit in apertures 22 between the adjacent shoes 8, which are arranged in four pairs, two pairs for each yoke. Each shoe 8 has a bearing shoulder 23 facing circumferentially to receive one end of the adjacent helical spring 9. A central guide tongue 24 projects perpendicularly from the face of each shoulder and extends somewhat into the cylindrical end of the spring member to guide the latter and secure it in alinement. These tongues meet when the joint is overloaded and so protect the spring against overstressing. Each shoe 8 has a convex outwardly disposed face 25 of arcuate shape to correspond with and to fit against the guide ring where it slides circumferentially to and fro in operation, depending upon variations in the torque force. A slight clearance space 26 is provided between the tips of adjacent shoe arms 8' so as to permit self-adjustment and gradual convergence of the shoes to compensate for any wear which may occur between the trunnion and shoe members.

The shaft member 1 is formed with a conoidal end 27 to fit in the correspondingly shaped axial perforation 28 of yoke member 4 wherein it is secured against relative turning by the spline 29 and against withdrawal by the end nut 30 which bears against the inwardly facing annular shoulder 31. The shaft member 2 is formed with a fluted end 32 adapted to fit slidably for longitudinal movement in the correspondingly fluted axial bore of the shank 33 of yoke 5.

A dust and fluid tight casing is provided for the joint comprising two pairs of complementary overlapping sections 34 and 35 as shown in Fig. 2, a packing ring 36 being provided at the overlap to permit relative movement of the sections without leakage. A helical compression spring 37 surrounds the shank 33 and bears outwardly against the inner casing member 35 to force the latter tightly against the overlying section 34 and packing carried thereby. The outer casing member 34 is provided with a radial flange 38 to fit snugly against the guide ring 7 or flange 10 on one side thereof and is secured tightly in place by the bolts 11. The inner casing member has an inwardly turned flange 39 to engage the outer end of spring 37, said flange fitting snugly but slidably against the yoke shank 33. The opposite end of said spring bears against the peripheral shoulder 33' on the shank 33. In order to conceal the outer edges of flanges 38 an overhanging bead shoulder 40 is provided on members 7 and 10 as shown on the lower side of Fig. 2. It is to be noted that the principal joint members are adapted to be made by drop-forging, and the casing parts may be formed from sheet-metal.

The above described joint may be assembled as follows: A yoke 4, having the shaft 1, nut 30 and spline 29 in place, is applied to the guide ring 7, the flange 10 being removed. The shoes 8 and springs 9 are then assembled in place whereupon the flange 10 is attached. The tension of the springs hold the shoes tightly against the retaining guide 7, the shoe arms 8' coming together except where the trunnions 21 hold them apart, as at 26.

The yoke 5 may then be applied by inserting the arms 5' into the guide ring with their perforations 19 in alinement with the guide perforations 12 and 14. The pin 6 is then thrust into place through the perforation 12, suitable force or driving being applied if necessary in order to force the coacting shoes apart sufficiently to admit said pin, this being facilitated by a slight end bevel on said pin. The plugs 15 and 16 being duly adjusted to resist the end thrust of pin 6 the cotter pins 17 are applied.

The casing members 34 and 35 may then be applied by assembling them lengthwise of the yoke shanks from the opposite directions, the springs 37 having first been brought into place and the packing rings 36 having been placed in the grooves 34' of the outer member. The said outer casing members are then secured in place by the bolts 11, thus completing the assemblage.

If preferred the casing members may be brought into place before any of the bolts 11 are applied to the ring flange 10.

It is to be noted that by the structure and arrangement set forth the parts may all be readily assembled without the application of any great force or need for any special tools, and the device may be assembled, cared for and taken apart by unskilled labor. The complementary shoe sections are adapted for ready assemblage with the springs in ring 7, and the subsequent insertion of the beveled pin 6 merely forces said sections apart about one sixteenth of an inch.

In operation the ring 7, pin 6 and adjacent shoes, as shown in Fig. 3, retain the same rotative angular position relative to one another, but the trunnions 21 of yoke 4 and shoes adjacent thereto oscillate peripherally in the guide channel 7. The trunnion members 21 and 6 all being rigid relative to their yokes the wear is limited to shoe friction on the guide ring and trunnions.

Although but one specific embodiment of this invention is herein shown and described, it is to be understood that numerous details of the construction shown may be altered or omitted without departing from the spirit of this invention as defined by the following claims.

I claim:

1. A cushioned torque universal joint including a pair of yokes to receive and deliver rotary power respectively, resilient yielding means interposed between the bearing parts of said yokes, a ring disposed in a transverse plane to hold said yokes and yielding means in effective circular alinement, and radially removable means carried by said ring adapted at its ends to serve as trunnions for one of said yokes, the other yoke having trunnions substantially integral therewith.

2. A cushioned torque universal joint including a pair of cross yokes disposed normally in quadrature and adapted to receive and deliver rotary power, yielding means interposed between the bearing parts of said yokes, a hollow inwardly facing yoke ring to hold said yokes and cushioning means in effective circular alinement, and diametrically disposed rigid means carried by said ring to secure one of said yokes demountably in coturnable relation to said ring, which ring is radially perforated to admit said yoke securing means endwise.

3. A cushioned torque universal joint, comprising an inwardly facing channel like casing ring, a pair of cross yokes mutually adapted to receive and deliver rotary power, resilient means disposed in cushion relation between the torque bearing parts of said yokes, one of said yokes having radial trunnions integral therewith disposed in said ring which has a removable flange to admit said resilient means and trunnions, and the other of said yokes being transversely apertured and having a removable transverse rod fitting therein the ends of which rod are adapted to serve as trunnions, and said ring having a radial perforation to provide for lengthwise assemblage and removal of said rod.

4. In a universal joint an inwardly facing channel ring having a removable flange, a pair of yokes having radial trunnions disposed in the channel of said ring, springs each with a pair of end shoes disposed in said channel between adjacent pairs of trunnions respectively, one of said yokes and said springs and shoes being admissable by removal of said flange, and the other yoke having a removable transverse rod the ends of which are adapted and positioned to serve as trunnions the latter mentioned yoke being admissable by the removal of said rod, said ring being radially perforated to admit said rod endwise after the said other parts are assembled.

5. In a universal joint an inwardly facing channel ring having oppositely positioned perforations, in combination with a pair of yokes and interposed torque cushioning means, one of said yokes having integral trunnions housed with said cushioning means in said ring, and the other yoke having a transversely disposed removable rod the ends of which serve as trunnions in said ring in cushioned relation to the first mentioned trunnions, said rod being removable through one of the ring perforations and the other perforation being adapted for the reception of a driving tool to force said rod out when required.

Signed at Moline this 11th day of Dec., 1922.

OTTO E. SZEKELY.